March 1, 1955  A. J. SARNO  2,703,022
DIE-CUTTING APPARATUS AND METHOD OF PRODUCING SAME Filed May 20, 1953  2 Sheets-Sheet 1

INVENTOR.
Amedeo John Sarno
BY
William F. Nickel
ATTORNEY

March 1, 1955  A. J. SARNO  2,703,022
DIE-CUTTING APPARATUS AND METHOD OF PRODUCING SAME
Filed May 20, 1953  2 Sheets-Sheet 2
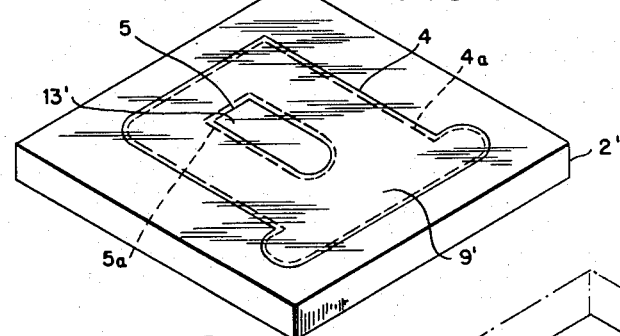
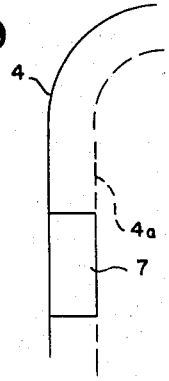
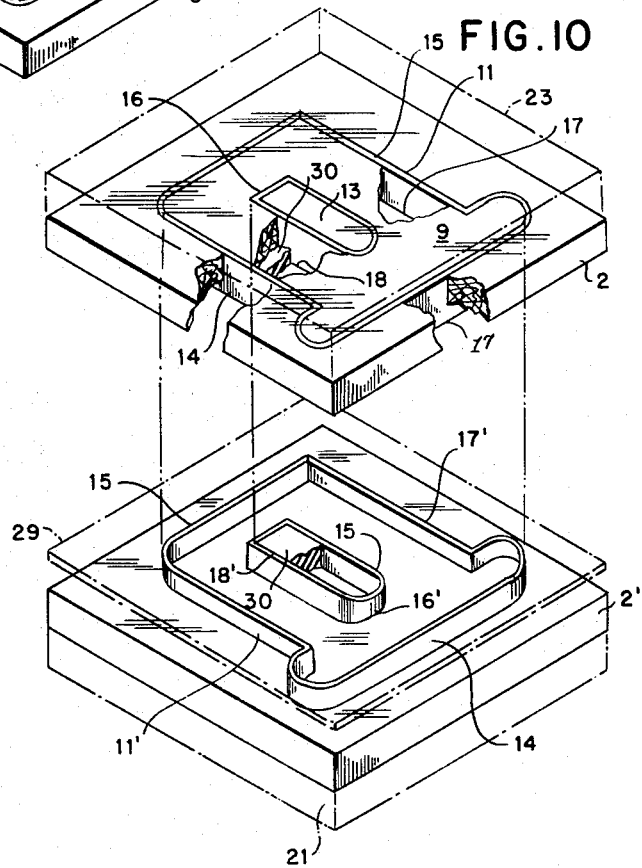
INVENTOR.
Amedeo John Sarno
BY
William F. Nickel
ATTORNEY

United States Patent Office 2,703,022
Patented Mar. 1, 1955

2,703,022

DIE-CUTTING APPARATUS AND METHOD OF PRODUCING SAME

Amedeo John Sarno, Oceanside, N. Y.

Application May 20, 1953, Serial No. 356,173

1 Claim. (Cl. 76—107)

My invention is an improved die-cutting apparatus and method of making cooperating die members; especially adapted to produce objects having a selected shape, from ordinary metal stock by shearing with steel blades or strips secured in place according to the shape of the objects or pieces required.

It is an object of this invention to provide a die of superior construction and efficiency, and a novel method of preparing and assembling the die and operating it in practice, at relatively low cost.

A further object is to provide die-cutting apparatus of simple design that can easily and quickly be prepared for use, and caused to deliver smooth and finished pieces which are structurally sound in all respects and without impairment of any kind.

An additional object of this invention is to devise a method and means for setting up apparatus that will make die-cut pieces of the exact size in all their dimensions, wholly without uneven or rough or partly bent edges, and free from minute cracks and fissures at all points.

Another object is to provide die-cutting apparatus having blades with extremely durable cutting edges that will not suffer deformation and impairment.

The nature and advantages of the invention and other objects thereof are fully described in the ensuing specification, and the novel features of my improvements are pointed out in the claim. The drawings illustrate a preferred construction, but the invention is not restricted merely to what the drawings present. In practice, variations in structural details and steps of proceeding may be adopted without departure from the principle incorporated in my invention.

On the drawings:

Figure 8 shows in perspective the beginning of a co-operating die member.

Figure 9 is a view similar to Figure 2 showing the first step in the formation of a matching or cooperating die member; and Figure 10 is a perspective view of both said die members completed and assembled in a die press for regular use.

Figure 1:
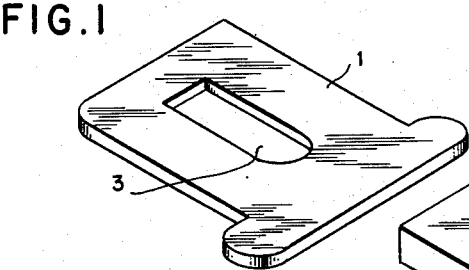
Figure 1 shows a pattern or piece of metal of given predetermined outline and size to be manufactured according to order.
Figure 2:
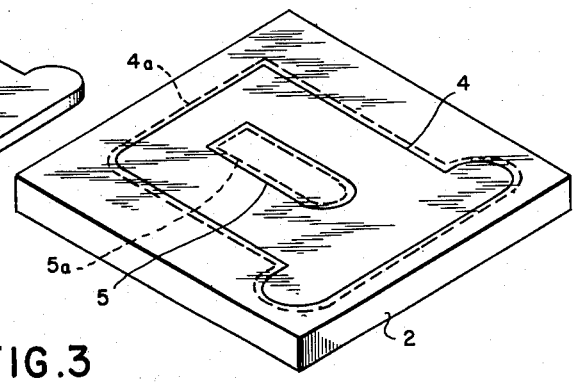
Figure 2 is a perspective view of the first step in the making of a die-cutting member to blank out pieces according to said pattern.

First, an outline enclosing a space of the same shape as a piece or pattern 1 to be die-cut, is drawn upon a block 2 of plastic or wood, for example, maple plywood, which is quite suitable for the purpose. The periphery of the piece 1 may be smooth along the outer edges or have sharply defined projections or recesses, or both, and its surface may be unbroken or present one or more openings 3. The pattern 1 may be laid on the block 2, and the peripheral outline 4 is traced with a clear and sharp line on the block 2 by a pointed implement, not shown. The enclosed area should be exactly the same in size as the piece to be die-cut and this area or portion enclosed within outline 4 is then cut free and removed. The thickness of the steel blades or cutting strips such as appear at 11 in Figure 10 to be used, must be taken into consideration. For example, if the strips are .032 inch thick, the cutting must be done along a space between the line 4 and the broken line 4a outside the line 4 and this space will have a width of the same thickness (.032 inch in this instance) as the die blade throughout. The block is then cut by a jig saw which moves along the outer side of the line 4, and takes away as much of said line 4, as possible.

Figure 4:
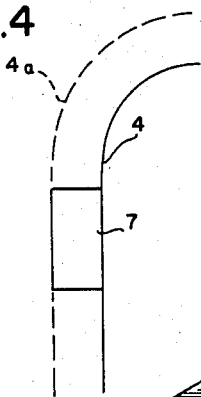
Figures 3 and 4 show on an enlarged scale how to perform such an operation.
Figure 3:
Figure 5:
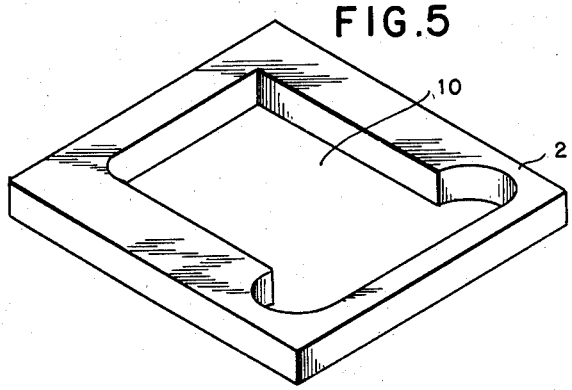
Figures 5, 6 and 7 are perspective views of further steps in the method of finishing such a die member.
Figure 6:
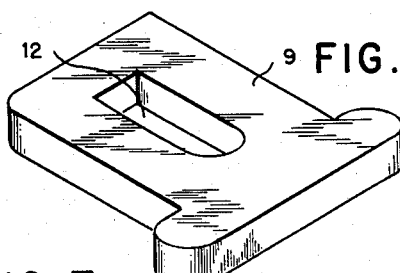
Figure 7:
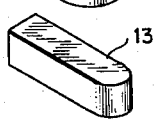

This operation is indicated diagrammatically on an exaggerated scale in Figure 4. Here the space between the line 4 and line 4a is illustrated as having a width equal to the thickness of the jig saw blade 7 which cuts with one face flush with the line 4 and the other flush with the line 4a. The thickness of the saw 7 equals the thickness of the blades for the die (.032 inch in the example given) and this makes its incision along the lines 4 and 4a. The distance between the two lines 4 and 4a thus represents precisely the allowance made for the thickness of the die-cutting elements or blades 11.

From the block 2 the cut-out section 9 is now removed, and the aperture 10 left in the block 2 now has the same shape as the piece 1 to be die-cut, but is somewhat larger. The next step is to line the edges of the opening closely with steel strips or blades 11 in one piece, or in separate lengths or sections, particularly at right-angled corners, to serve as the shearing elements of the die. The blades are bent beforehand to conform fully to the outline of the aperture 10, and when all are in position, the section 9 is replaced. This section has the same dimensions across it at all points as the piece to be produced, hence the cut-out section fits within the blades 11 tightly and binds all the blades 11 between the cut-out portion and the remainder of the plywood or plastic base member 2. See Figure 10.

Should the piece 1 have an opening 3 of any shape, the cut-out section 9 must present a corresponding opening or aperture 12. Therefore the block or member 2 is marked with a line 5 representing the opening, and of exactly the same size, and the block 2 is further cut by a jig saw along the space defined by this line and the parallel dashed line 5a within it. The cut-out part 13 is smaller all around than the opening 12 in the section 9 by an amount equal to the thickness of the saw, as before, and the saw employed for this step will have the same thickness as the blades 16 to line the opening 12 in the manner described above with reference to the aperture 10 and section 9. The cut-out part 13 is replaced in the portion 9 of the block 2 when the blades 16 for the opening 12 are in position and hold the blades 16 securely in the opening 12. The space within the blades 16 is smaller than the opening 3, but the outer faces of the blades 11 in the opening 12 enclose an area exactly the same in size as the aperture 3.

The die member is shown inverted at the upper half of Figure 10. The blades 11 and 16 are flush along one edge with the one face of the block 2, but wide or high enough to project out from the other face of the block about a quarter of an inch along their opposite edges which are also flush with one another. All blades or shearing elements 11 have smooth side faces 14, but their upper and lower edges are really narrow surfaces 15 that are at right angles to the surfaces 14; likewise the blades 16 around the part 13. The inner corners 17 of the blades surrounding the section 9 and the outer corners 18 of the blades 16 in the opening 12 do the actual shearing. The blades are therefore rugged and durable and will serve without deformation over long runs in real work. They can be specially hardened and resharpened as may be necessary.

Therefore when the die member comprising the blades 11 surrounding the periphery of the section 9 and the strips or blades 16 surrounding the portion 13 are actually pressed against a sheet of flat metal stock, the piece cut out by this die member will have the exact shape as the pattern 1 with the aperture 3, and the exact size also at all points.

The above described completed die member will serve as the so-called female die member, and a matching or male die member is needed. An accurate drawing or tracing is again made on a block 2' of the pattern 1 to produce the same outline 4, of the same shape, size and area as before, and the cut-out with the saw 7 is made along inside the outline 4, taking away as much of the line 4 as possible, but not going outside this line. The broken line 4a within the line 4 marks the width of the strip cut by the saw 7. This operation is indicated on Figure 8, and results in making the section 9' smaller than the corresponding section 9 above described. The section 9' is then removed, the blades 11' are put in, and the section is replaced. The outer faces of the blades 11', when the two blocks are in operative position in a press will be in close registry with the inner faces of the blades 11, which will envelop the blades 11'. The part 13' will be cut out with the saw moving along the outside of the line 5 along a strip between the line 5 and a line 5a at the outside of the line 5, as in making the cut to remove the section 9. The opening will thus be larger than the opening 3 or 12 to allow for the thickness of the cutting blades 16'. These blades 16' secured in the block 2' by the part 13' will envelop the blades 16 in the block 2. See the lower half of Figure 10.

The dies are now engaged with each other by inserting the blades 11' and 16 into the loops defined by the blades 11 and 16' respectively, and the two blocks are now mounted in a die press. The member having blades 11 and 16 and block 2 is then affixed inverted to the head 23 of the press and the head is operated so as to bring it close to the bed plate 21. The correct position of the block 2' having the blades 11' and 16' on the bed plate 21 is thus ascertained and the block 2' can then be affixed to the bed plate 21 so that the outer corners 17' of the blades 11' and the outer corners 17 of the blades 11 will cooperate in shearing the metal stock to reproduce the peripheral outline of the piece 1. Likewise the inner corners 18' of the blades 16' cooperate with the outer corners 18 of blades 16. Rubber 30 or other cushioning material is laid on the block 2 within the blades 11. Also rubber may be laid within the blades 16'. With the blades 16' enveloping the blades 16, rubber should be on the block 2' surrounded by the blades 16', to make sure the die cut pieces or scrap can be easily separated from the parts trimmed off by the die-members. The metal stock between the cutting die members is indicated at 29.

In Figure 10, the die first described above on the block 2 is shown with the working parts of the blades 11 and 16 lowermost to face the matching die on the block 2'. The narrow surfaces on the shearing parts of the blades 11 and 16, with the shearing corners 17 and 18 are the same as the surfaces 15 with similar corners, as will be understood.

Having described my invention, what I believe to be new is:

The method of producing cooperating cutting dies which consists in tracing a line on a base member to enclose an area having a desired outline and shape, making an incision of a width equal to the thickness of a cutting blade through said member along the outer side of said line throughout its length, filling said incision over its entire extent with blade portions bent to conform to said shape, and securing said blades to said member; also tracing a line on another base member to enclose an area having the outline and shape of the same pattern, making an incision of a width equal to the thickness of a die blade along the inner side of said line throughout its length, inserting portions of die blades bent to conform to said outline in said incision and securing said die blade portions to said other member, assembling said members so that the blade portions of the one member envelop the blade portions of the other, and fixing said assembled members each to a separate movable part of a press to secure them in correct operative positions.

References Cited in the file of this patent

UNITED STATES PATENTS

| | | |
|---|---|---|
| 163,674 | McKenzie | May 25, 1875 |
| 1,082,986 | Wilder et al. | Dec. 30, 1913 |
| 1,701,545 | Shan | Feb. 12, 1929 |
| 2,495,221 | Berlin | Jan. 24, 1950 |

FOREIGN PATENTS

| | | |
|---|---|---|
| 126,836 | Australia | Feb. 13, 1948 |